United States Patent Office 3,361,543
Patented Jan. 2, 1968

3,361,543
SYNTHESIS OF ALKALI METAL
TETRAFLUOROCHLORATES
George A. Tsigdinos, Boston, and James W. Dale, Winchester, Mass., assignors to Monsanto Research Corporation, St. Louis, Mo., a corporation of Delaware
No Drawing. Filed Apr. 1, 1963, Ser. No. 269,699
5 Claims. (Cl. 23—367)

This invention relates to a novel method of preparing fluorine compounds, and more particularly, to a novel and advantageous method of preparing alkali metal tetrafluorochlorates.

The alkali metal tetrafluorochlorates, such as cesium, rubidium and potassium tetrafluorochlorates, are powerful fluorinating and oxidizing agents. These compounds have been prepared hitherto by fluorination of the alkali metal chloride (J. Am. Chem. Soc., 83 (1961), 2955, 85 (1963), 307). This method uses elevated temperatures, at either atmospheric or elevated pressures. In either case, the reaction is slow, requiring days to reach high conversions. Moreover, it is difficult to obtain high purity of product by this method. The reaction is very exothermic, and the decomposition temperature may be exceeded locally. The tetrafluorochlorates decompose to the alkali fluoride and gaseous products upon heating to 350–400° C. in vacuum or in an inert gas stream, and the temperatures used in the fluorination method of synthesis, to get high conversions, have approached 300° C.

It is an object of this invention to provide an improved method of preparing alkali metal tetrafluorochlorates.

It is a particular object of the present invention to provide a new and improved method for the preparation of alkali metal tetrafluorochlorates which avoids the use of elevated temperatures and elevated pressures.

These and other objects will become evident upon a consideration of the following specification and claims.

It has now been found that the alkali metal tetrafluorochlorates are obtained in high conversions and a notably good state of purity by contacting an alkali metal halide with nitrosyl tetrafluorochlorate at temperatures below 0° C.

Employing temperatures as low as between —40° and —20° C., the reaction has been found to be rapid, smooth and controllable. Although the temperature is so much lower than the temperatures used in the fluorination method, the reaction is much faster, proceeding to completion in a matter of hours instead of days. The products are solids at room temperature, whereas except for the metal halide starting material, the reactants and by-products of the reaction are gases at room temperature. Thus by continuing the reaction until substantially complete conversion has been obtained, isolation of substantially pure metal tetrafluorochlorate product is a simple matter of allowing the reaction vessel to warm to room temperature (about 25° C.), and flushing off gases present in the reaction vessel. Thus it will be evident that the whole procedure is quite simple and convenient, and indeed, unlike the prior fluorination method, amenable to quantity production.

Another advantage is that by conducting the reaction in chlorine trifluoride as the reaction medium, the nitrosyl tetrafluorochlorate is regenerated in the course of the reaction and can be recovered substantially unchanged in amount at completion of the reaction.

A further advantage is the wider variety of halides from which the tetrafluorochlorates can be generated by the present method. Employing the fluorination method which has been the practice in the previously known high temperature method for metal tetrafluorochlorate preparation, the useful metal halides are limited to the chlorides. For the present purposes, either the chloride or the fluoride is useful.

Proceeding now to a consideration of the reactants employed in conducting the present novel method, nitrosyl tetrafluorochlorate is readily prepared as set forth in the copending application S.N. 781,880, filed Dec. 22, 1958, by James W. Dale, one of the present inventors. As stated in the said application, nitrosyl tetrafluorochlorate is a solid at least up to temperatures of about 0° C., and is readily prepared from nitrosyl fluoride and chloride trifluoride:

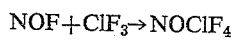
$$NOF + ClF_3 \rightarrow NOClF_4$$

The nitrosyl tetrafluorochlorate can also be prepared by reactions in which nitrosyl fluoride is formed as an intermediate, from nitric oxide and chlorine trifluoride

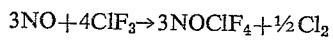
$$3NO + 4ClF_3 \rightarrow 3NOClF_4 + \tfrac{1}{2}Cl_2$$

and from nitrosyl chloride and chlorine trifluoride

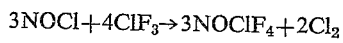
$$3NOCl + 4ClF_3 \rightarrow 3NOClF_4 + 2Cl_2$$

It can further be formed by reactions in which the chlorine trifluoride is also produced as an intermediate from the initial reactants, including the reaction of nitrosyl chloride, or nitric oxide plus chlorine, with fluorine:

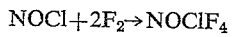
$$NOCl + 2F_2 \rightarrow NOClF_4$$

and

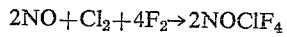
$$2NO + Cl_2 + 4F_2 \rightarrow 2NOClF_4$$

In referring to contacting an alkali metal halide with nitrosyl tetrafluorochlorate herein, what is intended to be meant is contact with either preformed nitrosyl tetrafluorochlorate or with a reaction mixture in which this compound is generated from precursors as shown above, by reaction of nitrosyl fluoride with chloride trifluoride, or indeed, from a reaction mixture in which one or both of the nitrosyl fluoride and chlorine trifluoride is itself formed in the reaction mixture from reaction of a combination of reactants selected from the group consisting of nitric oxide, nitrosyl chloride, nitrosyl fluoride, fluorine, chlorine and chlorine trifluoride.

The alkali metal halides useful in the practice of the present method are the chlorides and fluorides of the alkali metals forming stable tetrafluorochlorates. These are the alkali metals with high ionic radius: potassium, rubidium and cesium. Thus starting materials for the present synthesis may include potassium chloride, potassium fluoride, rubidium chloride, rubidium fluoride, cesium chloride, and cesium fluoride.

In conducting the reaction of the metal halide with the nitrosyl tetrafluorochlorate to provide the metal tetrafluorochlorate in accordance with the present method, it has been found advantageous to employ chlorine trifluoride as a reaction medium. Nitrosyl tetrafluorochlorate is a solid up to about 0° C., and the metal halides are solids, so that use of a liquid reaction medium is desirable. Moreover, nitrosyl fluoride is the byproduct of the reaction forming the metal tetrafluorochlorate from an alkali metal fluoride:

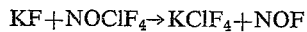
$$KF + NOClF_4 \rightarrow KClF_4 + NOF$$

and this will react with chlorine trifluoride to re-form the nitrosyl tetrafluorochlorate:

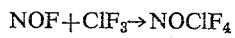
$$NOF + ClF_3 \rightarrow NOClF_4$$

The amounts of the metal halide and nitrosyl tetrafluorochlorate used in conducting the reaction can vary. Their ratio can be the stoichiometric 1:1 molar ratio corresponding to the equation

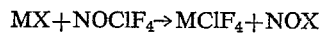
$$MX + NOClF_4 \rightarrow MClF_4 + NOX$$

where X is Cl or F. An excess of either reactant can be employed. Addition of a molar equivalent or an excess, such as 1.1 or 1.2 moles of nitrosyl tetrafluorochlorate per mole of the metal halide, is effective to produce the metal tetrafluorochlorate. Generation of the nitrosyl tetrafluorochlorate as an intermediate in the reaction mixture, from precursors, so that the metal halide is present in excess during the reaction, is also effective. When the nitrosyl tetrafluorochlorate is generated as an intermediate from precursors in the reaction mixture, the ratio of the precursors will generally be about the stoichiometric ratios shown in the above equations illustrating its synthesis. The amount of chlorine trifluoride in the reaction mixture should be enough to convert all the nitrosyl halide generated in the reaction mixture back to nitrosyl tetrafluorochlorate. In this connection, it is to be noted that since the nitrosyl tetrafluorochlorate is regenerated during the reaction, it is in effect a catalyst or carrier of the chlorine trifluoride, through which the latter is added to the metal fluoride. Thus, the amount of the nitrosyl compound present at any given time in the chlorine trifluoride reaction medium may be reduced to less than a molar amount. At least a mole of the nitrosyl tetrafluorochlorate per mole of the metal halide should be generated during the reaction, however. Substantially complete conversion of the metal halide to the metal tetrafluorochlorate is desirable, since removal of the metal fluoride from the metal tetrafluorochlorate product is not easy. On the other hand, the nitrosyl tetrafluorochlorate, the nitrogen and halogen precursors thereof such as chlorine trifluoride, and non-metallic products and by-products of the reactions occurring in conducting the conversion of the metal halide to the metal tetrafluorochlorate are gases at temperatures such as room temperature where the product is a stable solid. Thus they are readily removed from the product.

Temperatures for conducting the presently provided method of preparation will be below about 0° C. Nitrosyl tetrafluorochlorate dissociates at a temperature of about 0° C. under normal atmospheric pressure. Chlorine trifluoride is a liquid below about 12° C. Temperatures below about −100° C. are generally unnecessary, and suitably the temperature of reaction can be between about −50° and −10° C.

As will be appreciated by those skilled in the art of handling halogenated compounds of the presently employed nature, reaction vessels for conducting the present method will suitably be fabricated from materials inert to the reactants. For example, some metals may be passivated by the formation of a protective fluoride film which halts further reaction. Examples of particularly suitable metallic materials are copper and nickel. Structures made of inert polymeric materials such as tetrafluoroethylene and chlorotrifluoroethylene polymers can also be employed to contain these powerful oxidizing agents.

During and after the reaction, the reactants and products will need to be protected from the access of atmospheric moisture, with which they will react readily, by maintaining them in a dry box, under a blanket of dry nitrogen or the like.

In general, the conversion of the metal fluoride to the metal tetrafluorochlorate will be substantially complete in a matter of a few hours. Thereafter, the reaction vessel can be allowed to warm to room temperature, at which temperature the metal tetrafluorochlorates are stable and solid, whereby they are freed of the volatile components of the reaction mixture. If desired, these volatiles may be flushed out, as by passing a stream of an inert gas like nitrogen through the reaction mixture at such temperature. Volatiles including starting materials can be recovered for reuse, particularly in large scale operations.

The metal tetrafluorochlorate products of the presently provided method can be employed as fluorinating agents and oxidants, as intermediates in the preparation of oxidizers, or as oxidizers themselves, in rocket propellant compositions, for example. The solid form and stability of these compounds at moderate temperatures, in the range between about 20 and about 80° C., for example, when protected from access of moisture, adapts them for convenient storage and handling. The heavy, bulky cylinders required for containing gaseous oxidizing agents such as chlorine trifluoride under pressure are not necessary for the transport and storage of these powerful fluorinating agents. These metal salts can, indeed, be employed as a chlorine trifluoride carrier. Reaction of one mole of the solid metal tetrafluorochlorate with one mole of a Group V compound such as $ClF_2AsF_6$ and $Cl_2SbF_6$, which are also solids at room temperature, generates two moles of gaseous chlorine trifluoride. Although it is a reaction of two solids, the reaction goes close to quantitatively. Thus, where it is inconvenient to transport gaseous chloride trifluoride, for example, it can be converted to the metal tetrafluorochlorate salt, and maintained in this form of a solid stable at room temperature until its regeneration is desired, whereupon this is accomplished by contact of the solid metal salt with another solid, also thermally stable at ordinary temperatures.

The invention is illustrated but not limited by the following examples.

Example 1

This example illustrates preparation of cesium tetrafluorochlorate by the reaction of cesium fluoride with nitrosyl tetrafluorochlorate in chlorine trifluoride.

In a polytetrafluoroethylene container, at −78° C. (temperature of a bath made up of a mixture of trichloroethylene and solid carbon dioxide), and operating under a dry nitrogen atmosphere, 30 cubic centimeters (cc.) of liquid chlorine trifluoride and 7.6 grams (g.) of dry cesium fluoride are added to 8.0 g. of nitrosyl tetrafluorochlorate. The solution is then brought up to about −20° C. and stirred for three hours, after which it is allowed to warm to room temperature and the nitrogen flow is stopped. The contents of the reaction vessel are white solid cesium tetrafluorochlorate. The salt reacts violently with water, and oxidizes iodide to iodine. The solid weighs 11.88 grams, which corresponds to a 95% conversion of the cesium fluoride into cesium tetrafluorochlorate.

Example 2

This example illustrates the preparation of potassium tetrafluorochlorate by reaction of potassium fluoride with nitrosyl tetrafluorochlorate in chlorine trifluoride.

Addition of 2.99 g. of potassium fluoride and 30 cc. of liquid chloride trifluoride to 8.0 g. of nitrosyl tetrafluorochlorate at −780° C. is followed by warming to −20° C. and stirring the mixture at this temperature while maintaining the reactants under nitrogen. After 4 hours, the mixture is allowed to warm to room temperature. The white solid residue weighs 7.76 g. (theoretical yield calculated on KF, 8.0 g.). The metal salt decomposes violently with water and oxidizes iodide to iodine.

Example 3

This example illustrates preparation of rubidium tetrafluorochlorate.

Nitrosyl tetrafluorochlorate is prepared by passing a mixture of nitric oxide and nitrogen into 45 cc. of liquid chlorine trifluoride at −78°, until all the liquid chlorine trifluoride has been converted to solid nitrosyl tetrafluorochlorate.

A mixture of 5.28 g. of rubidium fluoride and 8.0 g. of nitrosyl tetrafluorochlorate in 35 cc. of chlorine trifluoride is stirred at between −45° and −20° C. for 3 hours, and then the temperature of the reaction mixture is allowed to rise to room temperature, providing 9.67 grams of product rubidium tetrafluorochlorate (98% conversion).

Substituting rubidium chloride for the fluoride in the above procedure, the product is again rubidium tetrafluorochlorate.

*Example 4*

This example illustrates preparation of an alkali metal tetrafluorochlorate from the metal fluoride and precursors of nitrosyl tetrafluorochlorate.

A mixture of nitric oxide and nitrogen is bubbled into a solution of 3.48 g. of potassium fluoride in 35 cc. of chlorine trifluoride at between −40 and −20° C. for 2.5 hours. The white solid product comprises potassium tetrafluorochlorate: it decomposes water violently and oxidizes iodide to iodine.

While the invention has been described with particular reference to various specific preferred embodiments thereof, it is to be appreciated that the modification and variations may be made without departing from the scope of the invention, which is limited only as defined in the appended claims.

What is claimed is:

1. A method for producing an alkali metal tetrafluorochlorate comprising the steps of:
   (a) reacting an alkali metal halide chosen from the group consisting of alkali metal chlorides and alkali metal fluorides with nitrosyl tetrafluorochlorate at a temperature below about 0° C. in an environment substantially free of moisture and in a liquid reaction medium comprising chlorine trifluoride and,
   (b) recovering the alkali metal tetrafluorochlorate.

2. The method of claim 1 wherein said alkali metal halide is an alkali metal fluoride.

3. The method of preparing potassium tetrafluorochlorate which comprises reacting potassium fluoride with nitrosyl tetrafluorochlorate in an environment substantially free of moisture and at a temperature below about 0° C. in a liquid reaction medium comprising chlorine trifluoride and recovering said potassium tetrafluorochlorate.

4. The method of preparing rubidium tetrafluorochlorate which comprises reacting rubidium fluoride with nitrosyl tetrafluorochlorate in an environment substantially free of moisture and at a temperature below about 0° C. in a liquid reaction medium comprising chlorine trifluoride and recovering said rubidium tetrafluorochlorate.

5. The method of preparing cesium tetrafluorochlorate which comprises reacting cesium fluoride with nitrosyl tetrafluorochlorate in an environment substantially free of moisture and at a temperature below about 0° C. in a liquid reaction medium comprising chlorine trifluoride and recovering said cesium tetrafluorochlorate.

References Cited

UNITED STATES PATENTS 3,110,558   11/1963   Markowitz et al. ____ 23—14 X

MILTON WEISSMAN, *Primary Examiner.*

E. STERN, O. R. VERTIZ, *Assistant Examiners.*